Figure 1:
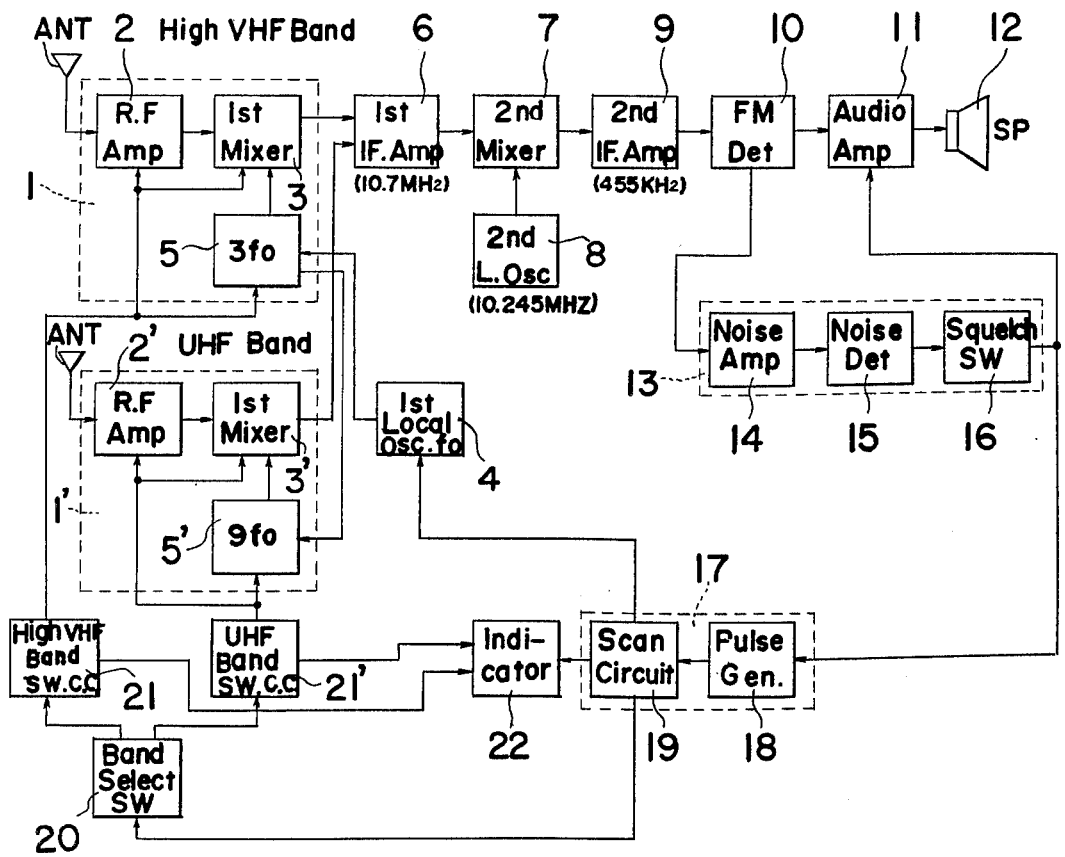

United States Patent [19]
Okada et al.

[11] 4,009,440
[45] Feb. 22, 1977

[54] RADIO RECEIVER

[75] Inventors: Hisao Okada, Neyagawa; Hideo Oyabe, Osaka; Isao Akita, Sakai, all of Japan

[73] Assignee: Sanyo Electric Co., Ltd., Moriguchi, Japan

[22] Filed: Aug. 27, 1975

[21] Appl. No.: 608,159

[30] Foreign Application Priority Data
Sept. 6, 1974  Japan .................................. 49-103305
Mar. 20, 1975  Japan .................................. 50-35145

[52] U.S. Cl. .................................. 325/335; 325/470
[51] Int. Cl.² .................................. H04B 1/36
[58] Field of Search ............. 325/334, 398, 455, 459, 325/470, 335; 331/64; 334/30, 36, 37

[56] References Cited
UNITED STATES PATENTS
3,824,475  7/1974  Pflasterer .................................. 325/470
3,895,303  7/1975  Imazeki et al. .................................. 325/334 X

*Primary Examiner*—Benedict V. Safourek
*Attorney, Agent, or Firm*—Darby & Darby

[57] ABSTRACT

A radio receiver for use in monitoring a plurality of channels of predetermined frequencies in a plurality of predetermined frequency bands, in which radio receiver, there are included an automatic scanning circuit for electrically scanning and switching a predetermined number of crystals preset to select a corresponding number of channels, and a specially arranged indication panel coupled to a receiving band indication circuit which is controlled by a receiving band control circuit with the receiving band control circuit being adapted to be controlled by an output from said automatic scanning circuit for quick identification of the band and the channel being received.

16 Claims, 15 Drawing Figures

RADIO RECEIVER

This invention relates to a radio receiver, and more particularly, to a radio receiver for use in monitoring a plurality of selected transmission channels in a plurality of frequency bands, which radio receiver is provided with indication means for showing the channel and band being received.

Generally, in the United States, various sorts of information or news are transmitted, whenever need arises, through particular frequency bands outside the ordinary broadcasting bands for the general public. Such particular transmissions are well-known as PSB (Public Service Broadcasting), to which three major carrier frequency bands are allocated, i.e., a low VHF band in the range of 30 to 50 MHz, a high VHF band of 150 to 170 MHz, and UHF band of 450 to 470 MHz, the carrier waves thereof being subjected to frequency modulation (FM) or phase modulation (PM) for transmitting signals for various activities, for example, of fire brigade, public security, highway patrol and weather forecasting or the like, in such a way that an A station is exclusively for traffic information, a B station mainly for weather forecasting, a C station only for local news and a D station is exclusively for emergency transmissions and so on.

Since such particular information and news are transmitted intermittently only when necessary, radio receivers for use in monitoring the same are mainly of automatic scanning channel selection type, in which radio receivers a predetermined plurality of frequencies are automatically scanned sequentially with the receivers being adapted to be locked on a frequency only if there is a transmission being received on that frequency.

In the above described particular broadcasting or transmission, since the station frequencies are allocated thereto normally at intervals of 30 KHz, the radio receiver for receiving such transmission is so arranged that a listener thereto selects proper crystals suitable for the desired frequencies for inserting the same into the receiving circuit of the receiver, or for exchanging such crystals depending on the situation. In practice, radio receivers ranging from 4 channel type capable of receiving 4 stations to 8 to 16 channel type are widely employed.

Conventionally, in the automatic scanning channel selection radio receivers of the above described type, indicator elements, such as electric lamps or light emitting diodes of a single color are employed for indicating the channels under reception. This arrangement, however, is very disadvantageous particularly when two or more frequency bands are to be received since, in such prior art receivers, it is not indicated which particular band is being received, although no inconvenience is experienced where only one band is to be received. Furthermore, in such conventional radio receivers of the above described type, indicator elements such as light emitting diodes are illuminating up to full brightness thereof even during automatic scanning to search for transmission signals, thus consuming electric power therein, although the same need not necessarily be fully eliminated during such scanning, which arrangement not only results in waste of limited electric power, particularly in the radio receivers of portable type wherein electric cells or battery are employed, but also causes indication elements to flicker rapidly particularly during automatic scanning with consequent unpleasant appearance of the radio receiver in functioning and fatigue of eyes on the part of users.

Accordingly, it is an essential object of the present invention to provide a radio receiver of multi-band scanning channel selection type which is equipped with indication means both for channel and band under reception with substantial elimination of the disadvantages inherent in the conventional radio receivers.

Another important object of the present invention is to provide a radio receiver of the above described type which is accurate in functioning and simple in construction, and can be manufactured at low cost.

A further object of the present invention is to provide a radio receiver of the above described type which is low in electric power consumption with consequent small running cost.

A still further object of the present invention is to provide a radio receiver of the above described type wherein illumination of the indicator means is stopped or dimmed for eliminating flickering of indication elements during automatic scanning.

According to a preferred embodiment of the present invention, the radio receiver includes an automatic scanning circuit for electrically scanning and switching a predetermined number of tuning elements or crystals preset to select a corresponding number of channels, and indicator means coupled to a receiving band indication circuit which is controlled by a receiving band control circuit with said receiving band control circuit being adapted to be controlled by an output from said automatic scanning circuit. More specifically, the indicator means includes a plurality of small openings formed, for example, in the front panel of the radio receiver and arranged at regular intervals in a direction parallel to the upper edge of the front panel, with channel number indications. Indicator elements such as a light emitting diode or indicator lamps of a particular color, for example, of green color for the high VHF band and a similar indication element of a different color, for example, of red color are incorporated with the two indication elements suitably arranged in pairs in such a manner that the high VHF band or the UHF band under reception is identified merely by the color of the indicator element being illuminated. Letters indicating that the green color represents the high VHF band and the red color the UHF band may suitably be displayed on the front panel. If the radio receiver is of a type capable of receiving more than two bands, the number of the indicator elements of different colors to be incorporated in each of the openings may be increased accordingly. In the case of the two band receiver capable of receiving, for example, the high VHF band and the UHF band as described above, the high VHF band and the particular channel being received are indicated by illuminating one of the green indicator elements, while the UHF band and the particular channel being received are indicated by illuminating one of the red indicator elements. Thus efficient identification both of the band and the channel under reception is readily achieved.

Furthermore, by controlling, depending on the presence of receiving signal, the receiving signal indication circuit which is controlled by the output of the automatic scanning circuit, it is made possible to suppress the functioning of the indication circuit during automatic scanning when there is no signal being received for eliminating or dimming flickering of the indicator elements, which arrangement not only contributes to reduction of power consumption to an appreciable extent, but is effective for improving appearance of the radio receiver during functioning and also for relieving eye strain.

Figure 2:
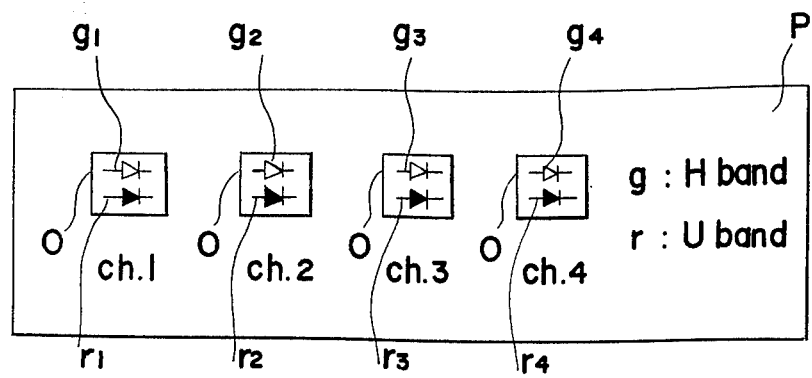
Figure 3:
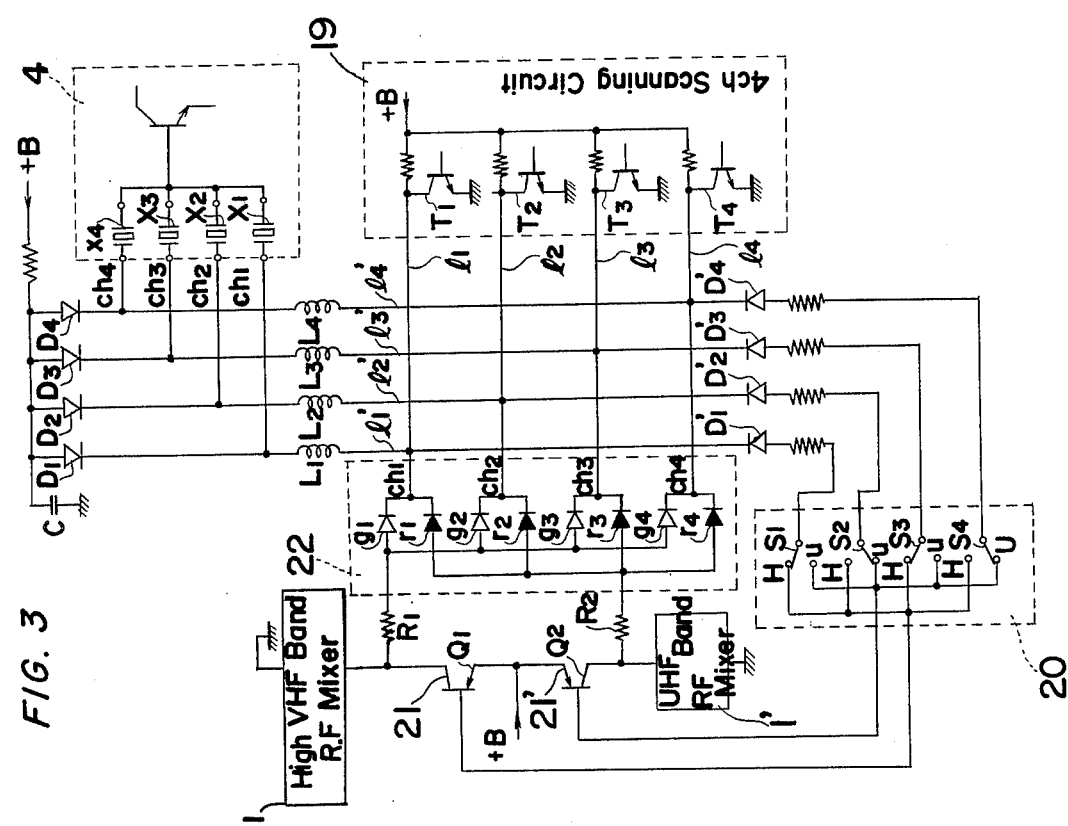
Figure 4:
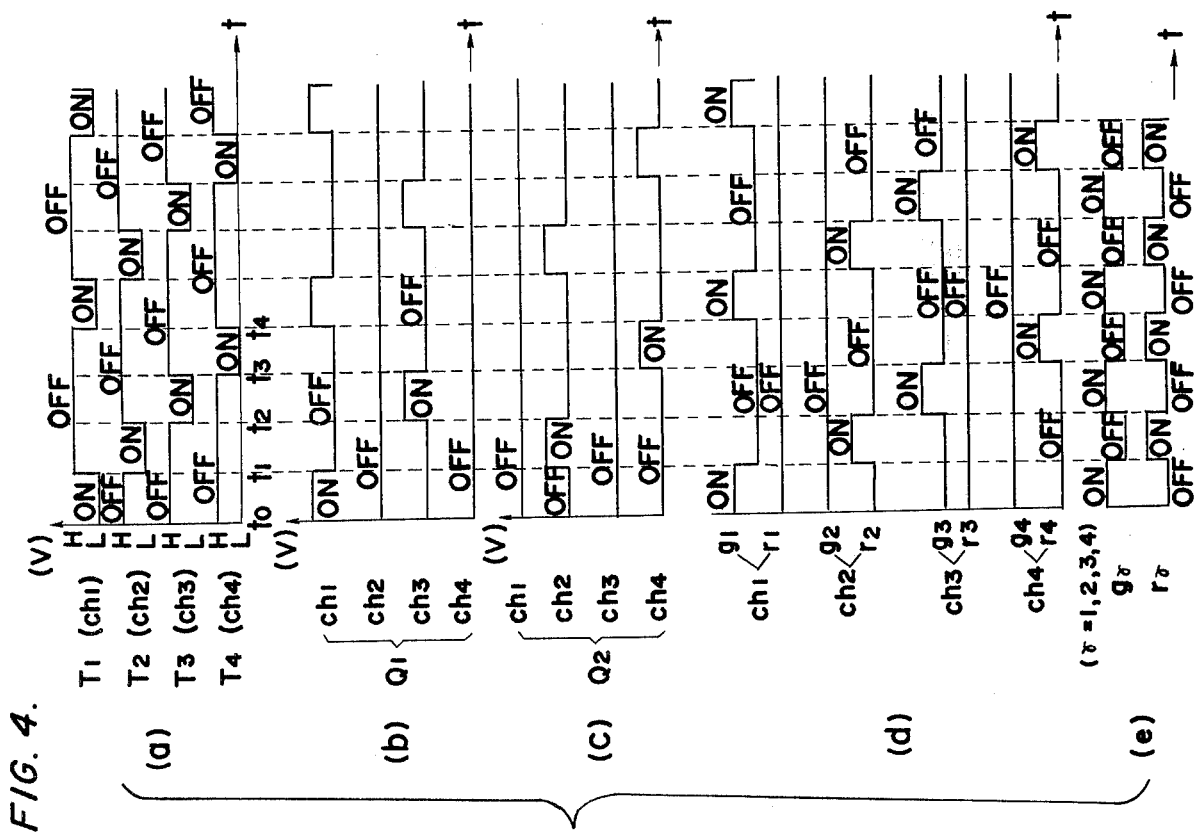
Figure 5:
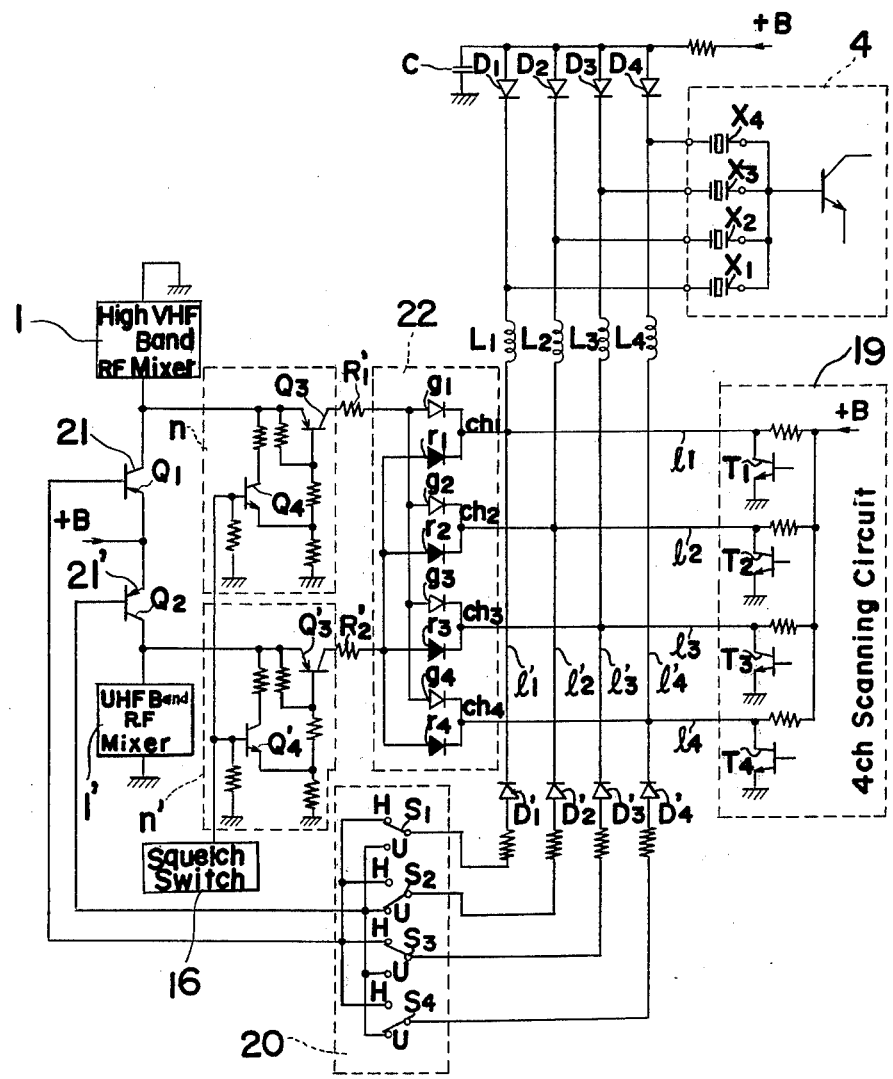
Figure 6:
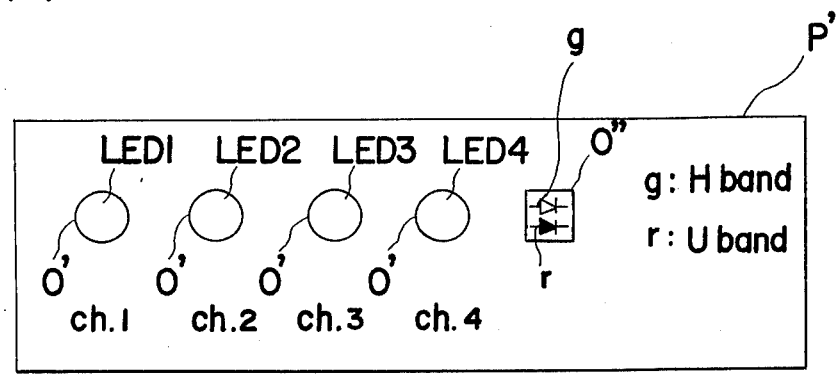
Figure 6:
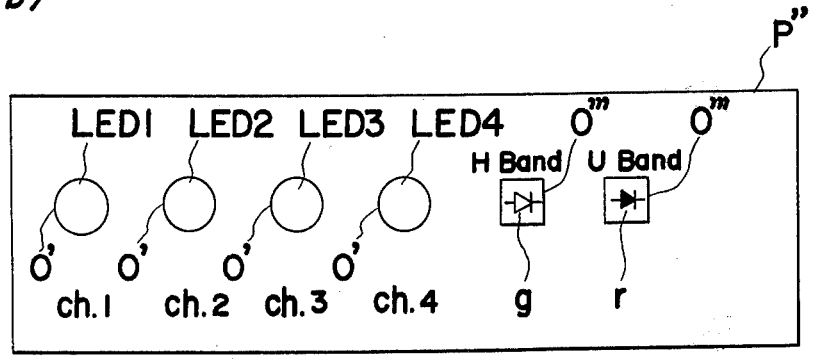
Figure 6:
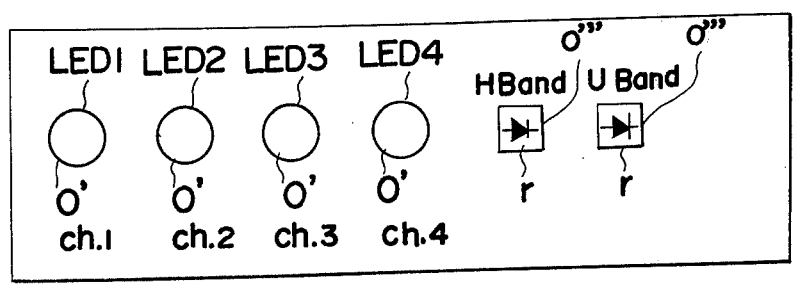
Figure 7:
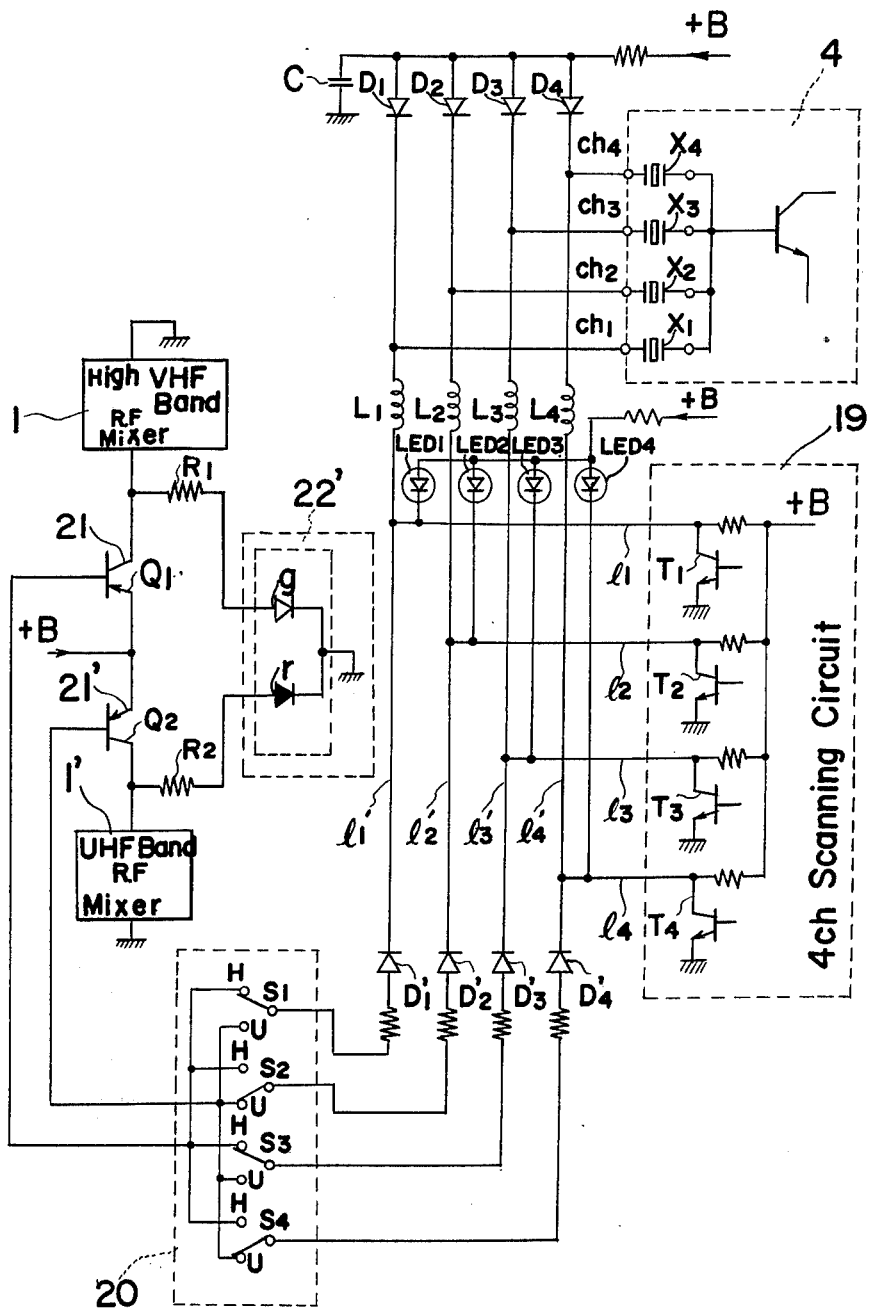
Figure 8:
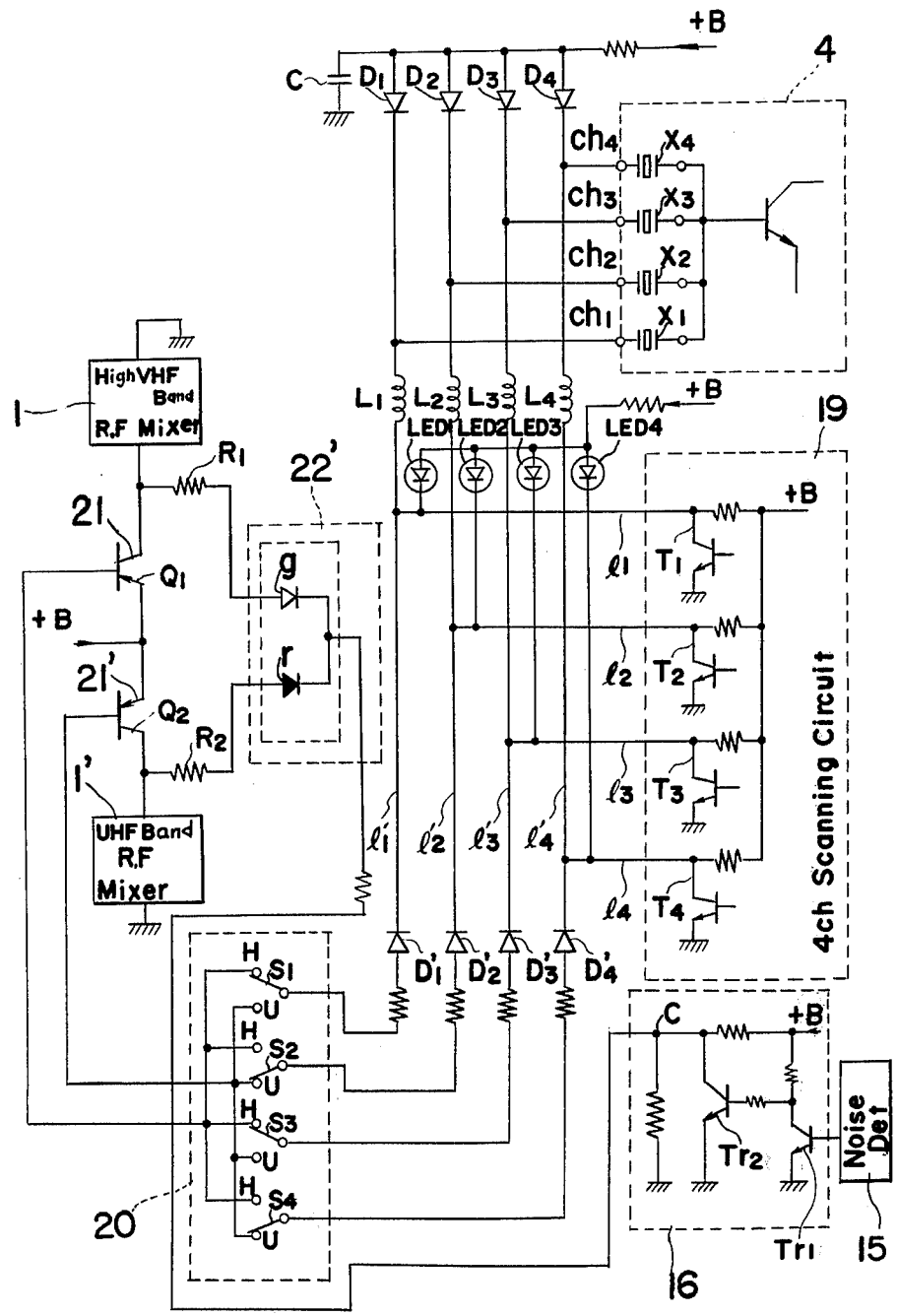
Figure 9:
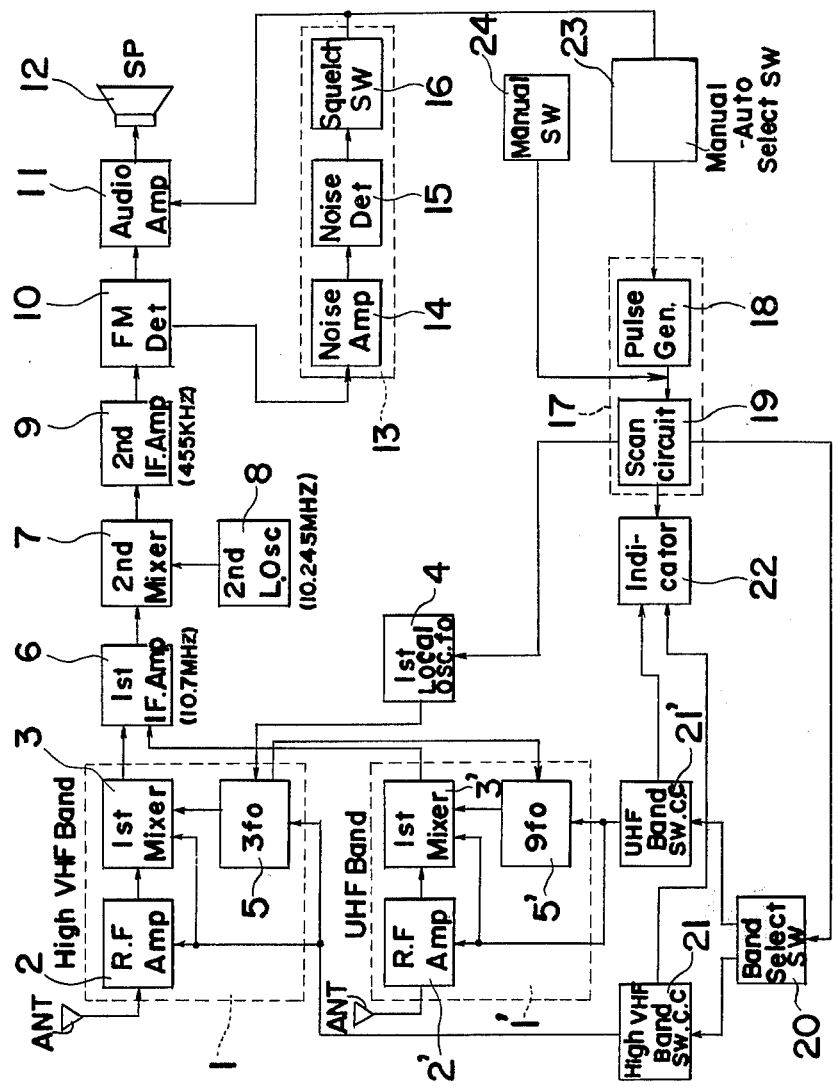
Figure 11:
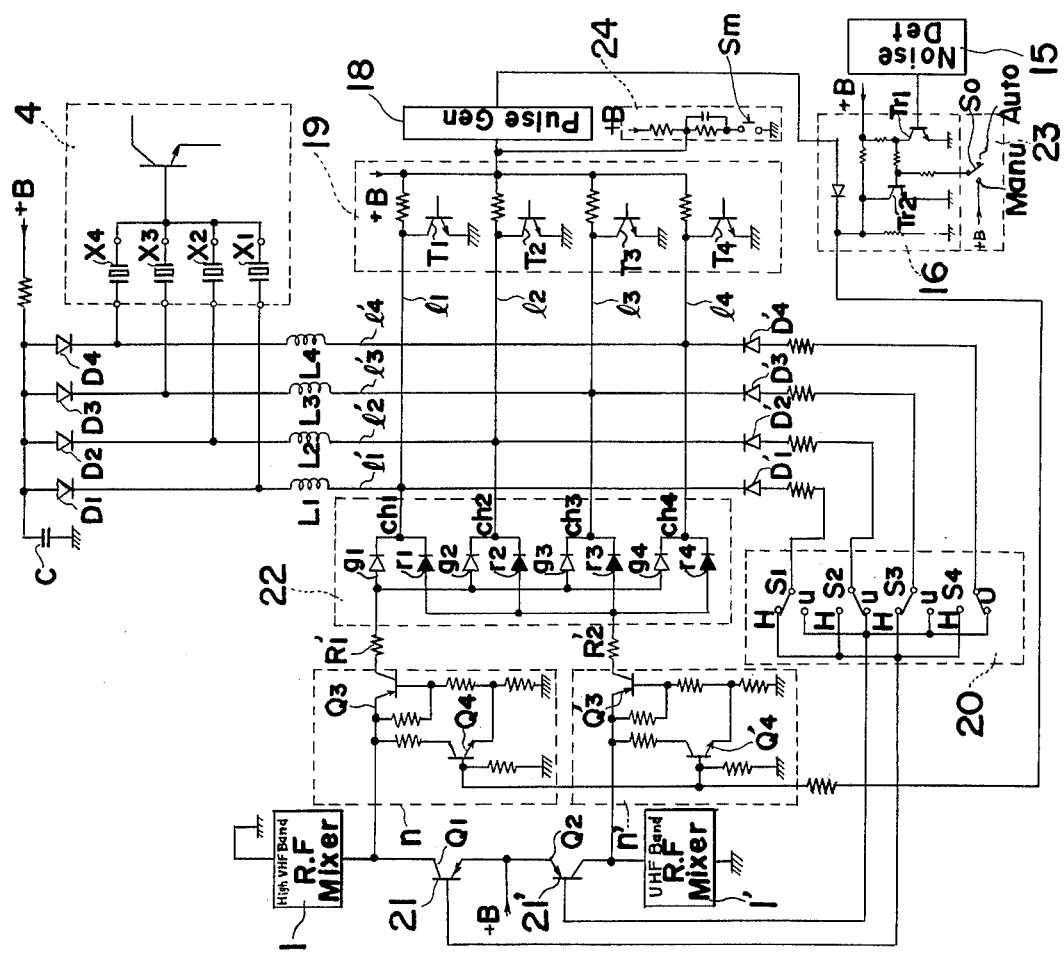
Figure 10:
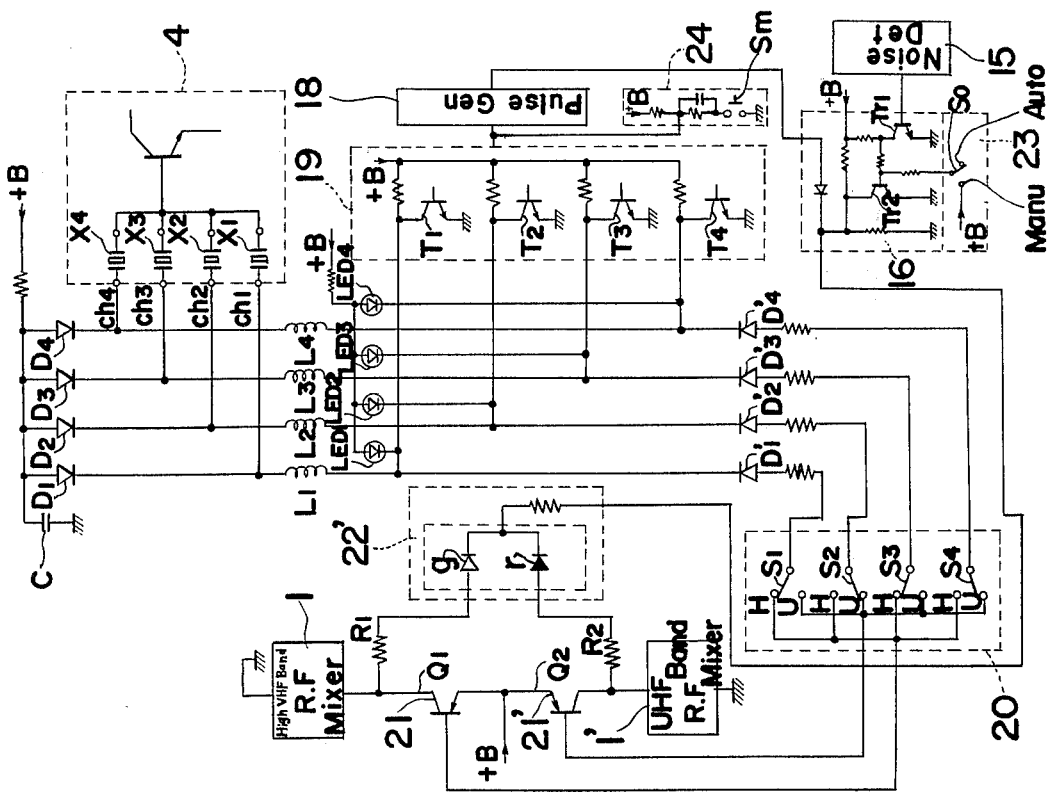
Figure 12:
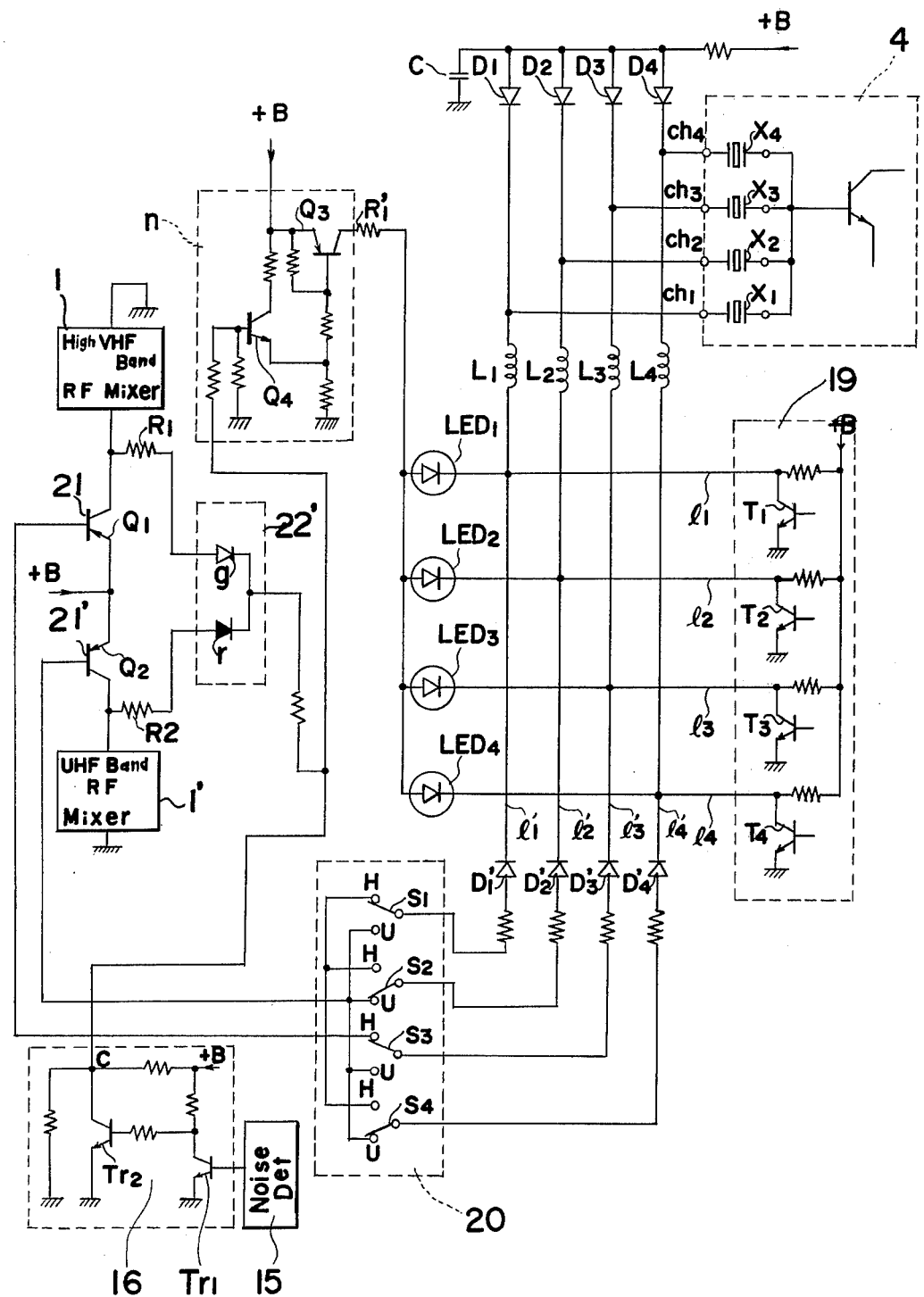
Figure 13:
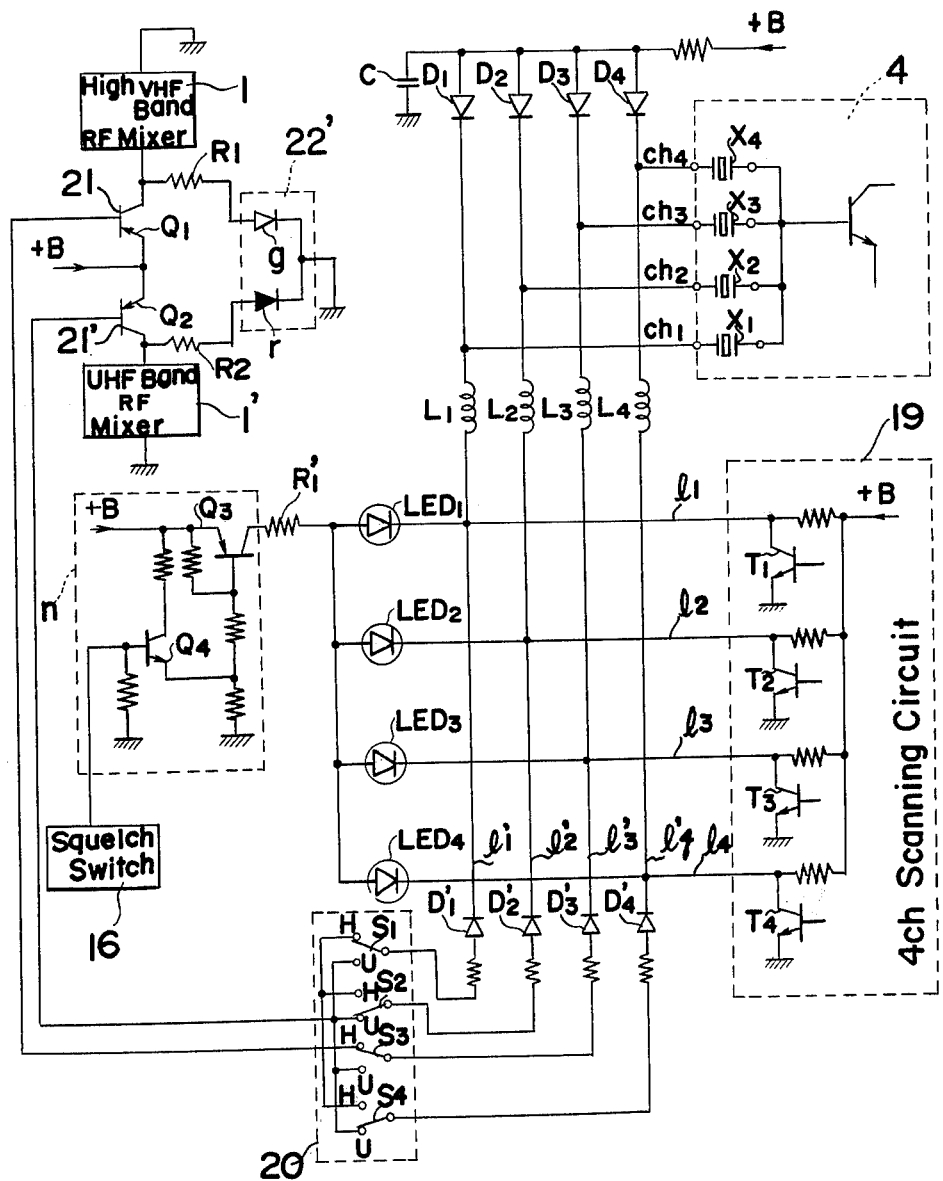

These and other objects and features of the present invention will become apparent from the following description taken in conjunction with a preferred embodiment thereof with reference to the attached drawings in which;

FIG. 1 is an electrical block diagram of a radio receiver of automatic scanning channel selection type incorporating therein an indicator circuit according to one embodiment of the present invention, FIG. 2 is a schematic front view of an indicator panel associated with the indication circuit of FIG. 1, in which the channel and band under reception are simultaneously indicated by the position and color of an indicator element being illuminated, FIG. 3 is a schematic electrical circuit diagram, particularly showing connections of the indication circuit of FIG. 1 wherein the indicator panel of FIG. 2 is incorporated, FIGS. 4(a) to 4(e) are diagrams explanatory of the functioning of various parts of the circuit of FIG. 3, FIG. 5 is a similar view to FIG. 3, but particularly shows a modification thereof, FIGS. 6(a) and 6(b) are similar views to FIG. 2, but particularly showing modifications thereof in which the channel and the band under reception are indicated by separate indicator elements of different colors, FIG. 6(c) is a similar view to FIG. 2, but particularly shows another modification thereof in which the channel and the band under reception are indicated by separate indicator elements of the same color, FIG. 7 is a schematic electrical circuit diagram, particularly showing another connections of the indication circuit of FIG. 1 wherein the indicator panel of FIG. 6(a), 6(b), or 6(c) is incorporated, FIG. 8 is a similar view to FIG. 7, but particularly shows a modification thereof, FIG. 9 is a similar view to FIG. 1, but particularly shows a modification thereof wherein a manual-auto selecting switch circuit is further incorporated, FIG. 10 is a similar view to FIG. 7, but particularly shows a modification thereof, FIG. 11 is a similar view to FIG. 5, but particularly shows a modification thereof, FIG. 12 is a similar view to FIG. 8, but particularly shows another modification thereof, and FIG. 13 is a similar view to FIG. 12, but particularly shows a further modification thereof.

Before the description of the present invention proceeds, it is to be noted that like parts are designated by like reference numerals throughout several views of the accompanying drawings.

Referring now to FIG. 1, there is shown an electrical block diagram of a radio receiver of automatic scanning channel selection type for two band reception according to the invention. The radio receiver includes a pair of front end portions 1 and 1', each surrounded by a dotted line, and coupled to an antenna for receiving separate frequency bands, i.e., a high VHF band and a UHF band. The front end portion 1 for the high VHF band comprises a radio frequency amplifier 2 coupled to a first mixer 3, and a frequency multiplication circuit 5, for example, a resonance circuit, for tripling a fundamental oscillation frequency $fo$ of a first local oscillator 4 to $3fo$. The output of multiplier circuit 5 is coupled to the first mixer 3 while the multiplier input of $fo$ is from the oscillator 4.

The front end portion 1' for the UHF band comprises a radio frequency amplifier 2' coupled to a first mixer 3', and a frequency multiplication circuit 5', for example, class C amplifier, which circuit 5' for tripling said frequency $3fo$ to $9fo$, has its output coupled to the first mixer 3' and its input to the frequency multiplication circuit 5. The mixers 3 and 3' are coupled, through a first intermediate frequency amplifier 6 whose carrier frequency is 10.7 MHz, to a second mixer 7 to which a second local oscillator 8 is connected. The second mixer 7 is further coupled to a second intermediate frequency amplifier 9 whose carrier frequency is 455 KHz, which amplifier 9 is in turn connected, through an FM detector 10, to an audio frequency amplifier 11 in a known manner to drive a speaker 12. A squelch circuit 13 surrounded by a dotted line in FIG. 1 comprising a noise amplifier 14, a noise detector 15 and a squelch switch 16 connected to each other is coupled to the FM detector 10 at the noise amplifier 14 with the squelch switch 16 connected to the audio frequency amplifier 11. The output from the squelch circuit 13 acts to stop functioning of the audio frequency amplifier 11 when no signal is received for preventing noise from coming out of the speaker 12. Similarly surrounded by a dotted line in FIG. 1, there is shown a scanning signal generating circuit 17 which comprises a pulse generator 18, for example, of an astable multivibrator and a scanning circuit 19, for example, of a four channel decoder. The pulse generator 18 is connected to the squelch switch 16, while the scanning circuit 19 is connected to the first local oscillator 4, to an indicator 22 and also to a band selecting switch circuit 20. The band selecting switch circuit 20 is selectively coupled to a high VHF band control circuit 21 or a UHF band control circuit 21', which band control circuits 21 and 21' are connected to corresponding front end portions 1 and 1' for the high VHF band and UHF band respectively, and are also coupled to the indicator 22 which is directly related to the present invention.

By this arrangement, when scanning signals developed in the scanning signal generating circuit 17 and having predetermined pulse widths repeated at predetermined intervals are applied to the frequency determining elements of the first local oscillator 4, the receiving channels are switched over one after another, through the scanning pulses, for example, in the order from channel 1 to channel 4 in the case of a four channel type. Upon reception of a transmission signal by the antenna, the oscillation of the pulse generator 18 is stopped by the output from the squelch circuit 13 and the transmission on that particular channel continues to be received. When the transmission signal being received by the antenna ceases, the pulse generator 18 starts oscillating, so that the channels are again scanned in the order of the channel 1 to channel 4, in which case, the frequency to be received in each of the channels 1 to 4 can be determined by properly selecting and replacing frequency-determining crystal means such as crystals $X_1$ to $X_4$ in the first local oscillator 4 as desired.

It should be noted here that, although not shown for brevity in FIG. 1, such frequency-determining crystal means are inserted in the oscillator circuit 4 with a first terminal thereof connected to the oscillator 4, and with a second terminal thereof coupled to the scanning circuit 19 and also to the high VHF band control circuit 21 or the UHF band control circuit 21' selectively for inserting the frequency-determining crystal means into an oscillating loop of the oscillator 4 in a manner disclosed, for example, in the U.S. Pat. No. 3,665,318.

In the above circuit of FIG. 1, the indication of the band and the channel under reception can advantageously be effected through the band selecting switch circuit 20, the high VHF band control circuit 21 and the UHF band control circuit 21' as described in detail hereinbelow.

Referring also to FIG. 2, the indicator 22 includes a plurality of small openings O formed, for example, at a suitable portion in a front panel P of a casing (not shown) of the radio receiver and preferably arranged at regular intervals in a direction parallel to an upper edge of the front panel P with channel numbers suitably marked in the vicinity of each of the openings O. Each of the openings O is preferably covered with transparent material such as glass or plastics so as to serve as an observation window. In each of the openings O an indicator element $g$ such as a light emitting diode or an indicator lamp of particular color, for example, of green color for the high VHF band and a similar indicator element $r$ of a different color, for example, of red color for the UHF band are incorporated with the two indicator elements suitably arranged in pair in such a manner that the high VHF band or the UHF band under reception is identified merely by the color of the indicator element being illuminated. Letters indicating that the green color represents the high VHF band and the red color the UHF band are suitably displayed on the front panel P. It is needless to say that such letters may be marked with particular colors, each corresponding to the color of the indicator element for the high VHF band or the UHF band for efficient identification of the band being received, in which case, letters $g$ or $r$ indicating "green" or "red" may be dispensed with. If the radio receiver is of a type capable of receiving more than two bands, the number of the indicator elements of different colors to be incorporated in each of the openings O may be increased accordingly. In the case of the two band receiver capable of receiving the high VHF band and the UHF band as described above, the high VHF band and the particular channel being received are indicated by illuminating one of the green indicator elements $g_1$ to $g_4$, while the UHF band and the particular channel being received are indicated by illuminating one of the red indication elements $r_1$ to $r_4$, thus the band and the channel under reception being efficiently identified simultaneously. In the indicator shown in FIG. 2, four openings O for four channel indication, i.e., from the channel 1 to channel 4 are formed, with indicator elements $g_1$ to $g_4$ for the high VHF band and $r_1$ to $r_4$ for the UHF band being incorporated in the corresponding openings O, while letters showing that the green is for the high VHF band and the red is for the UHF band are marked on the panel P adjacent to the right-most opening O.

It should be noted here that indicator elements of any two different colors may be incorporated in each of the openings O in any arrangement so far as these elements are disposed so as to clearly distinguish one band from the other when illuminated, and that the number of the indicator elements or colors thereof and the number of the openings O may be increased or decreased depending on the number of bands and channels to be received.

It is needless to say that the arrangement of the openings O is not limited to that described as effected in the embodiment of FIG. 2, but the openings O may be formed in any portion of the front panel P or of the casing (not shown) provided that the same are suitably arranged for quick and ready identification of the band and the channel being received.

Referring particularly to FIG. 3, there is shown a schematic electrical circuit diagram of the radio receiver of the invention, employing the indicator of FIG. 2. In the circuit of FIG. 3, the collector of a transistor $Q_1$ for the high VHF band control circuit 21 is connected to the front end portion 1 for the high VHF band and also to one side of each of the light emitting diodes $g_1$ to $g_4$ for the high VHF band indication through a current limiting resistor $R_1$. The collector of a transistor $Q_2$ for the UHF band control circuit 21' is connected to the front end portion 1' for the UHF band and also to one side of each of the light emitting diodes $r_1$ to $r_4$ for the UHF band indication through a current limiting resistor $R_2$. The emitters of the transistors $Q_1$ and $Q_2$ are connected to each other with the common junction thereof being connected to $+B$ voltage source. The other ends of each of four pairs of the light emitting diodes $g_1$ and $r_1$, $g_2$ and $r_2$, $g_3$ and $r_3$ and $g_4$ and $r_4$ in the indication circuit 22 are connected to each other respectively for the indication of the channel 1 to channel 4, while common junctions of each of the pairs of diodes $g_1$ and $r_1$, $g_2$ and $r_2$, $g_3$ and $r_3$, and $g_4$ and $r_4$ are connected, through the respective lines $l_1$ to $l_4$, to the collectors of corresponding transistors $T_1$ to $T_4$ of the scanning circuit 19. Each of the collectors is further connected, through a corresponding resistor, to a line leading to the $+B$ power source with the emitters of said transistors $T_1$ to $T_4$ being connected to earth. The base of the transistor $Q_1$ for the high VHF band control circuit 21 is connected to stationary contacts H of band selecting switches $S_1$ to $S_4$ of the band selecting switch circuit 20, while the base of the transistor $Q_2$ for the UHF band control circuit 21' is connected to corresponding stationary contacts U of the band selecting switches $S_1$ to $S_4$ of the band selecting switch circuit 20. The movable contact banks of the switches $S_1$ to $S_4$ of the switch circuit 20 are respectively connected via lines $l_1'$ to $l_4'$ to one end of channel selection switching diodes $D_1$ to $D_4$ through corresponding resistors, diodes $D_1'$ to $D_4'$ and high frequency choke coils $L_1$ to $L_4$. The lines $l_1'$ to $l_4'$ are correspondingly connected to the lines $l_1$ to $l_4$ between the choke coils $L_1$ to $L_4$ and the diodes $D_1'$ and $D_4'$. The other ends of the channel selection switching diodes $D_1$ to $D_4$ are connected to a line which is earthed at one end through a capacitor C and which is coupled to the $+B$ voltage source through a resistor. The lines $l_1'$ to $l_4'$ are each connected to the second terminals of the crystals $X_1$ to $X_4$ in positions between the switching diodes $D_1$ to $D_4$ and the choke coils $L_1$ to $L_4$, while the first terminals of such crystals $X_1$ to $X_4$ are coupled to the oscillation circuit 4 respectively. It should be noted that these crystals $X_1$ to $X_4$ are releasably inserted between the lines $l_1'$ to $l_4'$ and the circuit 4 and can be readily replaced with crystals of different frequencies depending upon the requirements. In operation, the transistors $T_1$ to $T_4$ in the scanning circuit 19 are rendered conductive one after another with the collector potential thereof sequentially reduced to a low level L as described in detail hereinbelow.

Referring also to FIGS. 4(a) to 4(e), for purposes of explanation consider that the crystals $X_1$ and $X_3$ of the oscillation circuit 4 and the band selection switches $S_1$ and $S_3$ are preliminarily set to the high VHF band reception channels with the crystals $X_2$ and $X_4$ and the band selection switches $S_2$ and $S_4$ being set to the UHF band reception channels as shown in FIG. 3. Since the transistor $T_1$ is turned on at the period of time ($t_0$ to $t_1$) the collector thereof is effectively at earth potential and the channel selection switching diode $D_1$ is biased in the forward direction to be turned on. Also the crystal $X_1$ is earthed through the coupling capacitor C. With an oscillating loop for the first local oscillating circuit 4 being thus completed, the circuit 4 oscillates at a predetermined frequency, in which case, the diode $D_1'$ is also turned on with the transistor $Q_1$ rendered conducting, so that the D.C. power +B is supplied to the front end portion 1 for the high VHF band through the emitter-collector circuit of said transistor $Q_1$ to cause the front end portion 1 to function for receiving the predetermined transmission on the high VHF band. It is to be noted that in the above condition, the switching transistor $Q_2$ is in the non-conducting state, since the transistors $T_2$, and $T_4$ are turned off.

Accordingly, upon conduction of the transistor $Q_1$, the collector potential thereof is raised to a high level H with a voltage in the forward direction being impressed to the green light emitting diode $g_1$ of the indication circuit 22, so that the diode $g_1$ is illuminated to indicate that the high VHF band is being received on the channel 1. Functionings of the transistors $T_1$ to $T_4$, $Q_1$ and $Q_2$, and the light emitting diodes $g_1$ to $g_4$ and $r_1$ to $r_4$ in the above described state are diagramatically shown in FIGS. 4(a) to 4(e).

Subsequently, in the time period ($t_1$ to $t_2$), the transistor $T_2$ is rendered conducting with the diode $D_2$ also turned on, so that the crystal $X_2$ is earthed through the coupling capacitor C so as to cause the local oscillation circuit 4 to oscillate at the predetermined frequency. In this case, the diode $D_2'$ is also turned on with the transistor $Q_2$ rendered conducting, so that the D.C. power +B is supplied to the front end portion 1' for the UHF band through the emitter-collector circuit of the transistor $Q_2$ to cause the front end portion 1' to function for receiving the predetermined transmission on the UHF band.

Upon conduction of the transistor $Q_2$, the collector potential thereof is raised with the red light emitting diode $r_2$ being biased in the forward direction so as to be illuminated to show that the UHF band is being received on the channel 2.

In the similar manner to that described above, during the time period ($t_2$ to $t_3$), the crystal $X_3$ is earthed to oscillate the circuit 4 and the green light emitting diode $g_3$ is illuminated for indicating that the high VHF band is being received on channel 3. Likewise, in the time period ($t_3$ to $t_4$), the red light emitting diode $r_4$ is illuminated to show that the transmission is received on the UHF band and also that the receiving channel is channel 4.

As is clear from the foregoing description, according to the indication circuit of the invention of FIG. 3, the receiving band is clearly indicated by properly selecting the colors of the indicator elements corresponding to the number of bands which can be received by the radio receiver, and the channel on which the transmission is being received is simultaneoulsy indicated by the position of the indicating element being illuminated, which arrangement makes it possible for the listeners to quickly identify the particular band and the channel under reception. If the receiver is of a type for receiving three bands of low VHF band, high VHF band and UHF band, the low VHF band may, for example, be indicated by "yellow," the high VHF band by "green" and UHF band by "red".

Referring now to FIG. 5, there is shown a modification of the circuit of FIG. 3. In this modification, special circuits n and n' are inserted between the collector of the transistor $Q_1$ for the high VHF band control circuit 21 and the indication circuit 22 through the current limiting resistor $R'_1$, and between the collector of the transistor $Q_2$ for the UHF band control circuit 21' and the indicator circuit 22 through the current limiting resistor $R'_2$ respectively as surrounded by dotted lines in FIG. 5 for reducing power consumption by the indicating elements and also for eliminating flickering of the indication elements during automatic scanning. In the circuit n, the collector of a current control transistor $Q_3$ is connected to the light emitting diodes $g_1$ to $g_4$ of the circuit 22 through the resistor $R'_1$ with the emitter of the same transistor $Q_3$ connected to the collector of the transistor $Q_1$. The base of the transistor $Q_3$ is earthed through two series-connected resistors and is also connected to the emitter of the same and the collector of the transistor $Q_1$ through a resistor. The collector of a switching transistor $Q_4$ is connected to the emitter of the transistor $Q_3$ and also to the collector of the transistor $Q_1$ through a resistor, while the emitter of the transistor $Q_4$ is connected to a common junction of the series-connected resistors in the base circuit of the transistor $Q_3$. The base of the transistor $Q_4$ is earthed through a resistor and is also coupled to the squelch switch circuit 16 through the base of a transistor $Q'_4$ in the circuit n'. Similarly, in the circuit n', the collector of a current control transistor $Q'_3$ is connected to the light emitting diodes $r_1$ to $r_4$ of the circuit 22 through the resistor $R'_2$ with the emitter of the same transistor $Q'_3$ connected to the collector of the transistor $Q_2$ while the base of the transistor $Q'_3$ is earthed through two series-connected resistors and is also connected to the emitter of the same transistor $Q'_3$ and the collector of the transistor $Q_2$ through a resistor. The collector of a switching transistor $Q'_4$ for the squelch switch circuit 16 (FIG. 1) is connected to the emitter of the transistor $Q'_3$ and also to the collector of the transistor $Q_2$ through a resistor, while the emitter of the transistor $Q'_4$ is connected to a common junction of the series-connected resistors in the base circuit of the transistor $Q'_3$ with the base of the transistor $Q'_4$ earthed through a resistor. Other construction of the circuit of FIG. 5 is similar to that of FIG. 3, so that description thereof is abbreviated for brevity.

By this arrangement, positive output voltage appears in the noise detection circuit 15 when no signals are received, since, in the circuit of FIG. 1, noise voltage developed in the FM detection circuit 10 during absence of any input signal in the antenna is amplified in the noise amplifier 14 to detect the noise by the noise detector circuit 15 and the output from the detector circuit 15 is applied to the squelch switch circuit 16. Accordingly, the positive output voltage thus developed in the circuit 16 during absence of transmission signals renders the switching transistors $Q_4$ and $Q'_4$ conducting with the emitter potential of said transistors increased and consequently with the base potential of the current controlling transistors $Q_3$ and $Q'_3$ also being raised, which state results in low biasing voltage between the emitters and bases of the transistors $Q_3$ and $Q'_3$ and increased internal impedance of the same transistors, so that less current flows in the light emitting diodes $g_1$ to $g_4$ and $r_1$ to $r_4$ which consequently become dim as compared with the normal brightness thereof when the transmission signal is being received. When the transmission signal is received by the antenna with detected output appearing in the FM detection circuit 10 (FIG. 1), the noise detection output disappears with the transistors $Q_4$ and $Q'_4$ consequently rendered non-conducting, which state reduces the internal impedance of the current control transistors $Q_3$ and $Q'_3$ and the light emitting diodes are illuminated at their normal full brightness.

As is seen from the foregoing description, in the modification of FIG. 5, the brightness of the indicating elements for the receiving bands and the channels is reduced to such a low level as to be barely noticeable by the naked eye in the absence of the transmission signals, while during reception of the transmission signals, the current flowing in the indicating elements is increased for clear indication of the bands and channels being received. Therefore, the power consumption in the indication circuit during the absence of transmission signals is advantageously decreased, while presence of input signals is simultaneously shown by the degree of brightness of the indicating elements, which arrangement is particularly effective for a radio receiver of portable type wherein power consumption must be kept as low as possible and also for eliminating flickering of the indicator elements particularly during automatic scanning.

It is needless to say that the indication circuit 22 may be adapted to cease functioning during absence of transmission signals for completely suppressing illumination of the light emitting diodes.

Referring now to FIGS. 6(a) and 6(b), there is shown a further modification of the indication panel of FIG. 2. In this modification, the indicator shown in FIG. 6(a) includes a plurality of small openings O′ formed, for example, at a suitable portion in a front panel P′ of a casing (not shown) of the radio receiver and preferably arranged at regular intervals in a direction parallel to an upper edge of the front panel P′ with channel numbers suitably marked in the vicinity of each of the openings O′, each of which openings O′ is preferably covered with transparent material such as glass or plastics so as to serve as an observation window. In each of the openings O′, an indicator element such as a light emitting diode LED or the like is visibly incorporated for the indication of the receiving channel, while another opening O″ is formed for the band indication in the front panel P′ in a position adjacent to the rightmost opening O′ of FIG. 6(a). In the opening O″ for the band indication, an indicator element g of a particular color, for example, of green color for the high VHF band and a similar indicator element r of different color, for example, of red color for the UHF band are incorporated. The two indicator elements g and r are suitably arranged in pair in such a manner that the high VHF band or the UHF band under reception is identified merely by the color of the indicator element being illuminated as in the case of the indication panel P of FIG. 2. Letters indicating that the green color represents the high VHF band and the red color the UHF band are suitably printed on the front panel P′ as shown. In this indication panel P′ also, such letters may be marked with particular colors, each corresponding to the color of the indicator element g or r for the high VHF band or the UHF band for efficient identification of the band being received, in which case, letters g or r indicating "green" or "red" described as marked in the panel of FIG. 6(a) may be dispensed with.

Alternatively, as shown in FIG. 6(b), the opening O″ of FIG. 6(a) may be replaced with a pair of openings O‴ which are arranged in a direction parallel to the axis connecting the openings O′ and suitably spaced from each other, with letters indicating the high VHF band or the UHF band suitably marked in the vicinity of the corresponding opening O‴, and with the corresponding indicator element g or r of a particular color, for example, of green color for the high VHF band or of red color for the UHF band being incorporated in each of the openings O‴, by which arrangement, the band under reception is readily identified by the geometrical positions of the openings O‴ and the color of the indicator element g or r being illuminated. Letters indicating the high VHF band or the UHF band may be marked adjacent to each of the opening O‴.

It should be noted that indicator elements of any two different colors may be incorporated in the single opening O″ of FIG. 6(a) in any arrangement so far as these two elements are disposed so as to clearly distinguish the high VHF band from the UHF band when illuminated, and that the number of the openings O′ and the number of the indicator elements of different colors to be built in the opening O″ may be increased or decreased depending upon the number of bands and channels to be received. Similarly, the arrangement of the openings O′ and O″ is not limited to that described as effected in the modification of FIG. 6(a), but these openings may be formed in any portion of the front panel P′ or of the casing (not shown) provided that the same are suitably arranged for quick and ready identification of the band and the channel being received.

It is needless to say that in the indicator panel P″ of FIG. 6(b), the number of the openings O‴ and the corresponding indication elements may also be increased according to the number of bands to be received. Likewise, the arrangement of the openings O‴ is not limited to that shown in FIG. 6(b), but may be arranged in any way or formed in any suitable place of the panel P″ or the casing (not shown) so far as the band under reception is clearly identified.

Similarly, the colors of the indicator elements enclosed in the openings O‴ illustrated as different from each other in the indication panel of FIG. 6(b) may be of the same colors, for example, of red color, as shown in the modification of FIG. 6(c), in which case, exactly the same circuit constructions as those described with reference to the panel of FIG. 6(b) in FIGS. 7, 8, 10, 12 and 13 mentioned below can also be employed.

Referring also to FIG. 7, there is shown a schematic electrical circuit diagram of the radio receiver of the invention employing the indicator of the modification of FIG. 6(a) or 6(b).

As compared with the circuit of the embodiment of FIG. 3, in the modified circuit of FIG. 7, the indication circuit 22 described as employed in the embodiment of FIG. 3 is replaced by an indication circuit 22′ merely for the band indication and the light emitting diodes $LED_1$ to $LED_4$ for the channel indication are each connected at one end thereof to the line $l_1$ to $l_4$ leading to the collectors of the transistors $T_1$ to $T_4$ with the other ends of the diodes $LED_1$ to $LED_4$ being connected to a line which leads to + B voltage source through a resistor.

The collector of the transistor $Q_1$ for the high VHF band control circuit 21 is connected to the front end portion 1 for the high VHF band and also to one side of the light emitting diode $g$ for the high VHF band in the indication circuit 22' through the resistor $R_1$, while the collector of the transistor $Q_2$ for the UHF band control circuit 21' is connected to the front end portion 1' for the UHF band and also to one side of the light emitting diode $r$ for the UHF band in the indication circuit 22' through the resistor $R_2$. The emitters of the transistor $Q_1$ and $Q_2$ are connected to each other with the common junction thereof connected to $+B$ voltage source as in the embodiment of FIG. 3. The other ends of the light emitting diodes $g$ and $r$ are connected to each other with the common junction thereof connected to earth.

By this arrangement, in the time period ($t_0$ to $t_1$) shown in FIG. 4, the transistor $T_1$ is turned on and the diode $D_1$ and $D_1'$ are also rendered conducting with the crystal $X_1$ being earthed, so that the first local oscillation circuit 4 oscillates at the predetermined frequency. Simultaneously the transistor $Q_1$ is turned on with the D.C. power $+B$ supplied to the front end portion 1 for the high VHF band through the emitter-collector circuit of the transistor $Q_1$ so as to cause the front end portion 1 to function, thus the predetermined transmission on the high VHF band being received. Simultaneously, voltage in the forward direction is applied to the green light emitting diode $g$ through the current limiting resistor $R_1$ to illuminate the same diode $g$, the green illumination of which indicates that the high VHF band is being received. Subsequently, in the time period ($t_1$ to $t_2$) of FIG. 4, the transistor $T_2$ is rendered conducting with the red light emitting diode $r$ illuminated for indicating that the UHF band is being received. On the other hand, the channel under reception is clearly indicated by the light emitting diodes $LED_1$ to $LED_4$. Since other construction and function of the circuit of FIG. 7 are similar to those of the embodiment of FIG. 3, description thereof is abbreviated for brevity.

Referring now to FIG. 8, there is shown another modification of the circuit of FIG. 7. In this modification, the common junction of the other ends of the light emitting diodes $g$ and $r$ connected to each other which is described as earthed in the circuit of FIG. 7 is not earthed, but is coupled to the noise detector circuit 15 (FIG. 1) through the squelch switch circuit 16 surrounded by a dotted line in FIG. 8. The circuit 16 is intended to dim the illumination for the band indication during automatic scanning for reducing power consumption and also for eliminating flickering of the indication elements, and includes a transistor $Tr_1$ whose base is coupled to the noise detector circuit 15 and whose collector is connected to $+B$ power source through a resistor which is further connected to the collector of a transistor $Tr_2$ through another resistor with the emitter of the transistor $Tr_1$ connected to earth. The collector of the transistor $Tr_1$ is further connected, through a resistor, to the base of the transistor $Tr_2$ whose emitter is also connected to earth, while the collector of the transistor $Tr_2$ is connected to a first terminal (point C) of a resistor and a second terminal of said resistor is earthed.

In the above arrangement, when no input signal is received, the output from the noise detector circuit 15 is high with the noise signal being present and with the transistor $Tr_1$ being turned on while the transistor $Tr_2$ is turned off, thus resulting in high output at the point C, which fact causes the light emitting diodes $g$ and $r$ to be dim.

Referring now to FIG. 9, there is shown a modification of the circuit of FIG. 1. In this modification, a manual-auto selecting switch 23 is further inserted in the line connecting the squelch switch 16 of the squelch circuit 13 to the pulse generator 18 of the scanning signal generating circuit 17. The circuit of FIG. 9 is further provided with a manual switch 24 which is coupled to the scanning circuit 19 of the scanning signal generating circuit 17. Other construction and function of the circuit of FIG. 9 are similar to those of FIG. 1, so that description thereof is abbreviated for brevity.

Referring now to FIG. 10 which shows a modification of the circuit of FIG. 7, and in which the manual-auto selecting switch 23 and the manual switch 24 described above are incorporated, the manual-auto selecting switch 23 is coupled to the squelch switch circuit 16. The base of a transistor $Tr_1$ in the squelch switch 16 is coupled to the noise detector circuit 15, while the collector of the same is connected to $+B$ power source through a resistor, and then to the collector of a transistor $Tr_2$ through another resistor, and also to the base of the transistor $Tr_2$ through a resistor with the emitter of the transistor $Tr_1$ being earthed. The base of the transistor $Tr_2$ is connected to the movable contact $S_0$ of the switch 23 through a resistor, which contact $S_0$ is switchable from the "auto" contact to the "manual" contact of the switch 23 or vice versa, while the collector of the transistor $Tr_2$ is coupled to the pulse generator 18 through a diode and is also connected to a first terminal of the resistor and a second terminal of said resistor is earthed. The collector of the transistor $Tr_2$ is further connected to the common junction of the light emitting diodes $g$ and $r$ of the indication circuit 22' through a resistor. On the other hand, the manual switch 24 comprises a push button switch $Sm$ having one stationary contact thereof connected to earth and the other stationary contact thereof connected to $+B$ power source through parallel-connected resistor and capacitor, and also through another resistor, the common junction of said two resistors being further connected to the junction between the scanning circuit 19 and the pulse generator 18.

By this arrangement, since the transistor $Tr_2$ in the squelch switch circuit 16 remains turned on irrespective of the presence of the transmission signal being received when the auto-manual selecting switch 23 is switched over to the "manual" side, upon depression of the push button $Sm$ in the manual switch 24, one pulse is generated which turns on either the transistor $Q_1$ or the transistor $Q_2$ through the output from the scanning circuit 19 for illuminating the diode $g$ or $r$ so as to indicate clearly the band being received even in absence of transmission signals during manual operation.

Other construction and function of the circuit of FIG. 10 during automatic scanning are similar to those in the circuit of FIG. 7, so that description thereof is abbreviated for brevity.

Referring now to FIG. 11, there is shown a modification of the circuit of FIG. 5. In this modification, the manual-auto selecting switch 23 and the manual switch 24 of the same construction as that described in the modification of FIG. 10 are incorporated. More specifically, the collector of the transistor $Tr_2$ in the squelch circuit 16 is connected through a resistor to the bases of the transistors $Q_4$ and $Q'_4$ in the circuit $n$ and $n'$.

In this circuit of FIG. 11 also, the transistor $Tr_2$ remains conducting without regard to the presence of the transmission signal when the auto-manual switch 23 is switched over to the "manual" side, so that one pulse is generated upon depression of the push button $S_m$ in the manual switch 24, which pulse turns on either the transistor $Q_1$ or the transistor $Q_2$, and further turns on one of the transistors $T_1$ to $T_4$ through the output of the scanning circuit 19 for the clear indication of the band and channel being received even in absence of transmission signals during manual operation. Other construction and function of the circuit of FIG. 11 during automatic scanning are similar to those in the circuit of FIG. 5, so that description thereof is abbreviated for brevity.

Referring now to FIG. 12, there is shown another modification of the circuit of FIG. 8. In this modification, the common junction of the light emitting diodes $g$ and $r$ is connected, through a resistor, to the point C of the squelch switch circuit 16 for dimming the illumination of the band indication elements $g$ and $r$ during automatic scanning, while the point C connected to the first terminal of the resistor is further connected through a resistor to the base of the transistor $Q_4$ of the circuit $n$ which is of the same construction to that employed in the circuit of FIG. 5 for dimming the illumination of the channel indication elements $LED_1$ to $LED_4$ during automatic scanning. The light emitting diodes $LED_1$ to $LED_4$ for the channel indication are each connected, at one end thereof, to the collectors of the corresponding transistors $T_1$ to $T_4$ of the scanning circuit 19, while the other ends of the diodes $LED_1$ to $LED_4$ are connected, through the resistor $R'_1$, to the collector of the transistor $Q_3$ of the circuit $n$ with the collector of the transistor $Q_4$ connected to $+B$ power source through a resistor. Other construction and functions of the circuit 16 and $n$ and the resistors $R_1$ and $R_2$ are similar to those described in the circuits of FIGS. 8 and 5, so that description thereof is abbreviated for brevity.

By the above arrangement, the brightness of both the channel and band indication elements is advantageously decreased during automatic scanning, which arrangement is very effective for reducing power consumption particularly in radio receivers of portable type wherein cells or batteries are employed as power source, and also for eliminating flickering of the indication elements particularly during automatic scanning.

Referring now to FIG. 13 which shows a further modification of the circuit of FIG. 12, the circuit $n$ is inserted between the indication elements $LED_1$ to $LED_4$ and the squelch switch circuit 16 for controlling the brightness of the channel indication during automatic scanning. In this modification, the base of the transistor $Q_4$ of the circuit $n$ is connected to the squelch switch circuit 16, by which arrangement, only the channel indication elements $LED_1$ to $LED_4$ are dimmed during automatic scanning, while the band indication elements $g$ and $r$ are kept at their full brightness, thus also contributing to the reduction of power consumption during operation with simple construction.

As is clear from the foregoing description, according to the scanning channel selection type radio receiver of the invention, the band indication circuit is advantageously incorporated for quick identification of the band of the channel being received, while the function of the receiving band indication circuit or of the receiving channel indication circuit is controlled by the presence of the input signals for reducing power consumption, which arrangement is very effective not only for efficient reception of the transmission signals and reducing running cost of the radio receiver when used with cell or battery power source, but also for eliminating unpleasant appearance of the radio receiver during automatic scanning and consequent eye strain due to flickering of the indication elements.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A radio receiver capable of tuning to signals of a plurality of channels of separately predetermined frequencies on a plurality of predetermined bands comprising a radio frequency section for each of said bands, each of said radio frequency sections having radio frequency signal receiving means and a mixer coupled to said radio frequency signal receiving means, a band control circuit for each of said radio frequency sections, oscillator means for applying beating signals to each of said mixers, a plurality of frequency-determining crystal means for connection to said oscillator means, said oscillator means producing a signal at one of said predetermined frequencies in one of said predetermined bands in response to each crystal being connected to said oscillator means, audio detection means coupled to said mixers for producing an audio signal when a radio frequency signal is being received, and band selecting means for selectively actuating each of said band control cicuits of said radio frequency sections for each of said plurality of said bands, said audio detection means further including squelch means for the prevention of producing an audio signal when a radio frequency signal is not being received, automatic scanning means coupled to said band control circuits through said band selecting means and to said plurality of crystal means to sequentially connect the crystal means to said oscillator means and to sequentially actuate said band control circuits, and indication means coupled to said automatic scanning means and also to said band selecting means so that said indication means is controlled by an output of said automatic scanning means and said band selecting means so as to indicate both a particular channel and a particular band being received simultaneously, said indication means comprising a plurality of sets of indication elements corresponding to the number of channels to be received with each of said sets further including a plurality of indication elements of different colors corresponding to the number of bands to be received, said band control circuits including means for energizing the indication element of each set of said elements corresponding to the band in which the channel is being received.

2. A radio receiver as claimed in claim 1 wherein said indication elements of same color in each of said sets are connected to each other, each at a first end thereof, means connecting said first ends to a corresponding one of band control circuits and also to the corresponding radio frequency section of a band with the second ends of said indication elements of the different colors in each of said sets being respectively connected to each other at a respective common junction with each of said common junctions being connected to said automatic scanning means, each of said common junctions being further connected to a respective one of said crystal means and to a respective one of said band selecting means whereby one of said indication elements of each set of elements is energized upon receipt of a signal of a channel for simultaneous indication of a band and a channel by a position and color of a single one of said indication elements of a set.

3. A radio receiver as claimed in claim 2 wherein each said band control circuit comprises a transistor whose collector is connected to said radio frequency section and whose base is coupled to said band selecting means with the emitter of said transistor being connected to the emitter of a similar transistor for a different band in said plurality of bands and with a common junction of said emitters being connected to the +B power source.

4. A radio receiver as claimed in claim 1 wherein each said indication element is a light emitting diode.

5. A radio receiver as claimed in claim 1 wherein each said indication element is an indication lamp.

6. A radio receiver capable of tuning to signals of a plurality of channels of separately predetermined frequencies on a plurality of predetermined bands comprising a radio frequency section for each of said bands, each of said radio frequency sections having radio frequency signal receiving means and a mixer coupled to said radio frequency signal receiving means, a band control circuit for each of said radio frequency sections, oscillator means for applying beating signals to each of said mixers, a plurality of frequency-determining crystal means for connection to said oscillator means, said oscillator means producing a signal at one of said predetermined frequencies in one of said predetermined bands in response to each crystal being connected to said oscillator means, audio detection means coupled to said mixers for producing an audio signal when a radio frequency signal is being received, and band selecting means for selectively actuating each of said band control circuits of said radio frequency sections for each of said plurality of said bands, said audio detection means further including squelch means for the prevention of producing an audio signal when a radio frequency signal is not being received, automatic scanning means coupled to said band control circuits through said band selecting means and to said plurality of crystal means to sequentially connect the crystal means to said oscillator means and to sequentially actuate said band control circuits, and indication means coupled to said automatic scanning means and also to said band selecting means so that said indication means is controlled by an output of said automatic scanning means and said band selecting means so as to indicate both a particular channel and a particular band being received simultaneously and further comprising indication dimming circuits corresponding to the number of said band control circuits connected between said indication means and said band control circuit for dimming brightness of said indication elements during absence of transmission signals, each of said dimming circuits being further coupled to said squelch means for being controlled by an output of said squelch means.

7. A radio receiver as claimed in claim 6 further comprising a manual-auto selecting switch connected to said squelch means, pulse generator means for actuating said scanning means, manual switch means connected to said pulse generator means and said scanning means for generating a pulse upon actuation of said manual switch means so that either one of said band control circuits turns on through an output of said scanning means.

8. A radio receiver capable of tuning to signals of a plurality of channels of separately predetermined frequencies on a plurality of predetermined bands comprising a radio frequency section for each of said bands, each of said radio frequency sections having radio frequency signal receiving means and a mixer coupled to said radio frequency signal receiving means, a band control circuit for each of said radio frequency sections, oscillator means for applying beating signals to each of said mixers, a plurality of frequency-determining crystal means for connection to said oscillator means, said oscillator means producing a signal at one of said predetermined frequencies in one of said predetermined bands in response to each crystal being connected to said oscillator means, audio detection means coupled to said mixers for producing an audio signal when a radio frequency signal is being received, and band selecting means for selectively actuating each of said band control circuits of said radio frequency sections for each of said plurality of said bands, said audio detection means further including squelch means for the prevention of producing an audio signal when a radio frequency signal is not being received, automatic scanning means coupled to said band control circuits through said band selecting means and to said plurality of crystal means to sequentially connect the crystal means to said oscillator means and to sequentially actuate said band control circuits, and indication means coupled to said automatic scanning means and also to said band selecting means so that said indication means is controlled by an output of said automatic scanning means and said band selecting means so as to indicate both a particular channel and a particular band being received simultaneously wherein said indication means comprises a set of indication elements of different colors for band indication which colors correspond to the number of bands to be received and a channel indication element for each channel, each of said band indication elements of different colors being connected, at a first end thereof, to corresponding one of the band control circuits and to said radio frequency section, the second ends of said band indication elements being connected to each other and subsequently to a point of reference potential, each of said band control circuits being further connected to said automatic scanning means through said band selecting means and also to one side of a channel indication element, each said channel indicating element being respectively connected to one of said crystal means, the other side of each said channel indication element being connected to a power source for separately indicating the band and the channel being received as the scanning means sequentially connects each crystal means to said oscillator means.

9. A radio receiver as claimed in claim 8 wherein each of said band control circuits comprises a transistor whose collector is connected to said band indication element and also to said radio frequency section and whose base is coupled to said band selecting means with the emitter of said transistor being connected to the emitter of a similar transistor of a band circuit for a different band in said plurality of bands and with a common junction of said emitters being connected to a power source.

10. A radio receiver as claimed in claim 8 further comprising channel indication dimming circuit means connected between a line to which said other sides of said channel indication elements are connected and said power source for controlling brightness of said channel indication element, said channel indication dimming circuit being further coupled to said squelch means.

11. A radio receiver capable of tuning to signals of a plurality of channels of separately predetermined frequencies on a plurality of predetermined bands comprising a radio frequency section for each of said bands, each of said radio frequency sections having radio frequency signal receiving means and a mixer coupled to said radio frequency signal receiving means, a band control circuit for each of said radio frequency sections, oscillator means for applying beating signals to each of said mixers, a plurality of frequency-determining crystal means for connection to said oscillator means, said oscillator means producing a signal at one of said predetermined frequencies in one of said predetermined bands in response to each crystal being connected to said oscillator means, audio detection means coupled to said mixers for producing an audio signal when a radio frequency signal is being received, and band selecting means for selectively actuating each of said band control circuits of said radio frequency sections for each of said plurality of said bands, said audio detection means further including squelch means for the prevention of producing an audio signal when a radio frequency signal is not being received, automatic scanning means coupled to said band control circuits through said band selecting means and to said plurality of crystal means to sequentially connect the crystal means to said oscillator means and to sequentially actuate said band control circuits, and indication means coupled to said automatic scanning means and also to said band selecting means so that said indication means is controlled by an output of said automatic scanning means and said band selecting means so as to indicate both a particular channel and a particular band being received simultaneously wherein said indication means comprises a set of indication elements of different colors for band indication which colors correspond to the number of bands to be received and a channel indication element for each channel, each of said band indication elements of different colors being connected, at a first end thereof, to corresponding one of the band control circuits and to said radio frequency section with second ends of said band indication elements being connected to each other and subsequently, coupled at a common junction thereof to said squelch means for dimming band indication, said band control circuits being further selectively connected to said automatic scanning means through said band selecting means and also to one side of a channel indication element, each said channel indicating element being respectively coupled to one of said crystal means with the other side of each said channel indication element being connected to a power source for separately indicating the band and the channel being received and for dimming said band indication element during scanning as the scanning means sequentially connects each crystal means to said oscillator means.

12. A radio receiver as claimed in claim 11 wherein each said band control circuit comprises a transistor whose collector is connected to said band indication element and also to said radio frequency section and whose base is coupled to said band selecting means with the emitter of said transistor being connected to the emitter of a similar transistor of a different band control circuit for said plurality of bands and with a common junction of said emitters being connected to the [+ B] power source.

13. A radio receiver as claimed in claim 11 further comprising a manual-auto selecting switch for selective manual operation or automatic scanning of said radio receiver connected to said squelch means, pulse generator means for actuating said scanning means, said squelch means being coupled to said common junction of said second ends of said band indication elements, and a manual switch coupled to said scanning means and said pulse generator means for generating a pulse upon actuation of said manual switch during manual operation so that either one of said transistors of said band control circuits turns on through an output of said scanning [circuit] means.

14. A radio receiver as claimed in claim 11 wherein said common junction of said second ends of said band indication elements is coupled to said squelch means, a channel indication dimming circuit means connected between said other sides of said channel indication elements and [a line leading to] said squelch means and with said channel indication dimming circuit being further coupled to said power source for controlling brightness both for band and channel indication elements.

15. A radio receiver capable of tuning to signals of a plurality of channels of separately predetermined frequencies on a plurality of predetermined bands comprising a radio frequency section for each of said bands, each of said radio frequency sections having radio frequency signal receiving means and a mixer coupled to said radio frequency signal receiving means, a band control circuit for each of said radio frequency sections, oscillator means for applying beating signals to each of said mixers, a plurality of frequency-determining crystal means for connection to said oscillator means, said oscillator means producing a signal at one of said predetermined frequencies in one of said predetermined bands in response to each crystal being connected to said oscillator means, audio detection means coupled to said mixers for producing an audio signal when a radio frequency signal is being received, and band selecting means for selectively actuating each of said band control circuits of said radio frequency sections for each of said plurality of said bands, said audio detection means further including squelch means for the prevention of producing an audio signal when a radio frequency signal is not being received, automatic scanning means coupled to said band control circuits through said band selecting means and to said plurality of crystal means to sequentially connect the crystal means to said oscillator means and to sequentially actuate said band control circuits, and indication means coupled to said automatic scanning means and also to said band selecting means so that said indication means is controlled by an output of said automatic scanning means and said band selecting means so as to indicate both a particular channel and a particular band being received simultaneously wherein said indication means includes a set of indication elements of the same color for band indication which corresponds to the number of bands to be received, each of said band indication elements of same colors being connected, at a first end thereof, to corresponding one of the band control circuits and to said radio frequency section with second ends of said band indication elements being connected to each other and subsequently to a point of reference potential, each of said band control circuits being further connected to said automatic scanning means through said band selecting means, a resistor and also to one side of a channel indication element and subsequently coupled to said crystal means which is connected to said oscillator means, the other side of said channel indication element being connected to said power source for separately indicating the band and the channel being received.

16. A radio receiver capable of tuning to signals of a plurality of channels of separately predetermined frequencies on a plurality of predetermined bands comprising a radio frequency section for each of said bands, each of said radio frequency sections having radio frequency signal receiving means and a mixer coupled to said radio frequency signal receiving means, a band control circuit for each of said radio frequency sections, oscillator means for applying beating signals to each of said mixers, a plurality of frequency-determining crystal means for connection to said oscillator means, said oscillator means producing a signal at one of said predetermined frequencies in one of said predetermined bands in response to each crystal being connected to said oscillator means, audio detection means coupled to said mixers for producing an audio signal when a radio frequency signal is being received, and band selecting means for selectively actuating each of said band control circuits of said radio frequency sections for each of said plurality of said bands, said audio detection means further including squelch means for the prevention of producing an audio signal when a radio frequency signal is not being received, automatic scanning means coupled to said band control circuits through said band selecting means and to said plurality of crystal means to sequentially connect the crystal means to said oscillator means and to sequentially actuate said band control circuits, and indication means coupled to said automatic scanning means and also to said band selecting means so that said indication means is controlled by an output of said automatic scanning means and said band selecting means so as to indicate both a particular channel and a particular band being received simultaneously wherein said indication means includes a set of indication elements of the same color for band indication which corresponds to the number of bands to be received, each of said band indication elements of the same color being connected, at a first end thereof, to corresponding one of the band control circuits and to said radio frequency section with the second ends of said band indication elements being connected to each other and subsequently, coupled at a common junction thereof to said squelch means for dimming band indication, said band control circuits being further connected to said automatic scanning means through said band selecting means, a resistor and also to one side of a channel indication element and subsequently coupled to said oscillating means, the other side of said channel indication element being connected to said power source for separately indicating the band and the channel being received and for dimming said band indication element during scanning.

* * * * *